United States Patent
Van Ewijk et al.

(10) Patent No.: US 11,220,606 B2
(45) Date of Patent: Jan. 11, 2022

(54) WATER-IN-OIL COATING COMPOSITION

(71) Applicant: Akzo Nobel Coatings International B.V., Arnhem (NL)

(72) Inventors: Gerard Antonie Van Ewijk, Leiden (NL); Diana Lucia Santangelo, Oegstgeest (NL); Matthijs Solleveld, Monster (NL)

(73) Assignee: Akzo Nobel Coatings International B.V., Arnhem (NL)

( * ) Notice: Subject to any disclaimer, the term of this patent is extended or adjusted under 35 U.S.C. 154(b) by 0 days.

(21) Appl. No.: 17/261,742

(22) PCT Filed: Jul. 25, 2019

(86) PCT No.: PCT/EP2019/069996
§ 371 (c)(1),
(2) Date: Jan. 20, 2021

(87) PCT Pub. No.: WO2020/020989
PCT Pub. Date: Jan. 30, 2020

(65) Prior Publication Data
US 2021/0246317 A1 Aug. 12, 2021

(30) Foreign Application Priority Data

Jul. 27, 2018 (EP) ..................... 18186071
Feb. 7, 2019 (EP) ..................... 19156020

(51) Int. Cl.
*C09D 5/02* (2006.01)
*C09D 167/08* (2006.01)
*C09D 191/00* (2006.01)
*C09D 7/40* (2018.01)

(52) U.S. Cl.
CPC ........... *C09D 5/022* (2013.01); *C09D 167/08* (2013.01); *C09D 191/005* (2013.01); *C09D 7/40* (2018.01)

(58) Field of Classification Search
CPC .. C09D 5/022; C09D 167/08; C09D 191/005; C09D 7/40
USPC ........................................... 106/238
See application file for complete search history.

(56) References Cited

U.S. PATENT DOCUMENTS

| 4,386,171 | A | * | 5/1983 | Graham et al. | C09D 5/022 |
| | | | | | 523/337 |
| 4,615,379 | A | | 10/1986 | Künzel | F28D 17/02 |
| 6,780,910 | B2 | | 8/2004 | Bouvy et al. | C08J 3/00 |
| 2011/0104501 | A1 | | 5/2011 | Watson et al. | C08K 5/17 |
| 2013/0296486 | A1 | | 11/2013 | Tennebroek et al. | |
| | | | | | C09D 177/12 |
| 2015/0299499 | A1 | | 10/2015 | Ledford et al. | C09D 133/00 |
| 2017/0112133 | A1 | | 4/2017 | Bos et al. | A01N 47/18 |

FOREIGN PATENT DOCUMENTS

EP 0042684 A1 12/1981 ............... C09D 5/02

OTHER PUBLICATIONS

Search Report of Corresponding EP Application No. 18186071.9, dated Jan. 15, 2019.
International Search Report and Written Opinion for PCT/EP219/069996 dated Sep. 26, 2019.
P. Aurenty et al., Water-In-Alkyd-Resin Emulsions: Droplet Size and Interfacial Tension, Langmuir 1995, 11, pp. 4712-4718.
Directive 2004/42/CE of the European Parliament and of the Council of Apr. 21, 2004, Official Journal of the European Union, Apr. 30, 2004, pp. L 143/87-L143/96.
XP009116664, Plastics—Determination of Average Molecular Mass and Molecular Mass Distribution of Polymers Using Size-Exclusion Chromatography—Part 1:General Principles, International Standard, ISO 16014-1, First Edition Mar. 15, 2003, pp. 1-22.

* cited by examiner

*Primary Examiner* — Hui H Chin
(74) *Attorney, Agent, or Firm* — Pauly, DeVries Smith & Deffner LLC

(57) ABSTRACT

A water-in-oil coating composition comprising a water phase emulsified in a non-aqueous liquid phase, wherein the non-aqueous phase comprises one or more binders including an autoxidizable binder, characterized in that the composition has a solids content in the range of from 5 to 50 wt % and a water content in the range of from 40 to 90 wt %, and wherein the value A defined by the sum of the mass-average molecular mass of the one or more binders divided by 1,400, 1.7 times the solids content, and the water content, is at most 130, wherein the mass-average molecular mass is expressed in gram/mole and the solids content and the water content are each expressed in wt % based on the total weight of the composition.

14 Claims, No Drawings

WATER-IN-OIL COATING COMPOSITION

CROSS-REFERENCE TO RELATED APPLICATIONS

This application is a 35 U.S.C. § 371 national phase application of PCT Application No. PCT/EP2019/09996 (WO 2020/020989 A1), filed on Jul. 25, 2019, which claims the benefit of priority to EP Application Nos. 18186071.9, filed on Jul. 27, 2018 and 19156020.0, filed Feb. 7, 2019, each of which is incorporated herein by reference in its entirety.

FIELD OF THE INVENTION

The present invention relates to a water-in-oil coating composition comprising a water phase emulsified in a non-aqueous liquid phase, wherein the non-aqueous phase comprises one or more binders including an autoxidizable binder and to a substrate coated with a coating deposited from such water-in-oil coating composition.

BACKGROUND OF THE INVENTION

Autoxidizable binders are well-known in the coatings industry. Autoxidizable binders comprise autoxidizable groups such as unsaturated carbon-carbon bonds.

Drying oils, such as linseed oil, safflower oil, soybean oil, tung oil, dehydrated castor oil, or the like, are examples of autoxidizable binders. Such oils have inherent autoxidizable functionality that may be catalyzed in the presence of a drier (also referred to as siccative).

Other examples of autoxidizable binders are film-forming polymers with autoxidative functionality. Examples of such film-forming polymers include alkyd resins and other resins with autoxidative functionality such as unsaturated ether groups such as found in e.g. allyl ethers, cyclopentenylethers and vinyl dioxanes, and polymers or copolymers of butadiene.

Alkyd resins are widely used in coating compositions such as paint. An alkyd is a fatty acid functionalized polyester resin that comprises unsaturated fatty acids, such as for example oleic acid, linoleic acid, or linolenic acid. Drying of paints comprising autoxidizable binders, comprises evaporation of the liquid carrier (organic solvent and/or water) and, subsequently, hardening of the binder via radical autoxidation reactions. The latter is known as chemical or oxidative drying. The fatty acid moieties of the alkyd resin react with oxygen from the atmosphere to form hydroperoxides which subsequently decompose to form free radicals. Recombination of these free radicals causes covalent bonds to be formed between the alkyd polymer chains, thus forming cross-links between polymer chains. In this way, a liquid coating composition that comprises alkyd resin hardens to form a solid cured coating. This process is also referred to as autoxidation or oxidative drying.

The time for autoxidizable binders to dry depends on the concentration of unsaturated bonds in the binder. Autoxidation and crosslinking of the unsaturated bonds can proceed unaided, but the time for drying is generally found to be unacceptably long for many practical purposes. The reactions are significantly accelerated by the presence of a metal-based drying catalyst, commonly referred to as a "drier" or "siccative". Such driers are well-known in the art.

Alkyd paints typically form a hard, glossy surface that is easy to clean and resists scratching, water, and chemicals. They are primarily used for trim, doors, cabinets, furniture, floors and other high-use areas, and are popular with professional painters because they adhere well to most surfaces and "level out" to hide brush marks and small surface irregularities, and cure to a smooth surface that latex paints cannot match.

Alkyd paints often are solvent-based. Such solvent-based alkyd paints comprise an organic solvent in which the alkyd resin is dissolved. Such solvent-based paints typically comprise high levels of volatile organic compounds (VOC). Today, water is often added to solvent-based alkyd paints in order to reduce the VOC content. Such paints are often referred to as alkyd paints with water inclusion, alkyd/water inclusion paints, or water-in-oil paints. Typical alkyd/water inclusion paints contain 5-15% of water in the liquid formulation. However, water-in-oil alkyd paints with water contents up to 30% do exist.

Further increasing the amount of water in a water-in-oil paint results in a rapid increase of viscosity and deterioration of the levelling out of brush marks after application. This might even make it impossible to spread out the paint over a surface.

There is a need for autoxidizable coating compositions, such as alkyd based coating compositions, which are formulated as water-in-oil compositions with further increased water content in order to have low VOC levels, whilst having acceptable applicability.

SUMMARY OF THE INVENTION

Surprisingly, it has now been found that if the relationship between the solids content (SC), the water content (WC), and the mass-average molecular mass (Mw) of the binder(s) in a water-in-oil composition meets certain requirements, the water content in the water emulsion can be increased to values of 40 wt % and above. If the requirements are met, the water-in-oil composition shows acceptable applicability. Compositions according to the invention have a lower cost price per liter compared to compositions with lower water levels and allow for a reduction of the solid contents (SC) without increasing the VOC levels.

Accordingly, the invention provides in a first aspect a water-in-oil coating composition comprising a water phase emulsified in a non-aqueous liquid phase, wherein the non-aqueous phase comprises one or more binders including an autoxidizable binder, characterized in that:

i. the composition has a solids content (SC) in the range of from 5 to 50 wt % based on the total weight of the composition;

ii. the composition has a water content (WC) in the range of from 40 to 90 wt % based on the total weight of the composition;

iii. the one or more binders have a mass-average molecular mass (Mw) expressed in gram/mole, as determined in accordance with GPC ISO 16014-1; and iv. the solids content of the composition, the water content of the composition and the mass-average molecular mass of the one or more binders are such that value A is at most 130, wherein value A is defined as:

$$A=[(Mw/1400)+(1.7 \times SC)+WC]$$

wherein Mw is expressed in gram/mole and SC and WC are each expressed in wt %.

An important advantage of the water-in-oil coating composition of the present invention is that the applicability of the composition is good or at least acceptable for a painter, whilst cost price and VOC are reduced.

In a second aspect, the invention provides a substrate coated with a coating deposited from a water-in-oil coating composition according to the first aspect of the invention.

DETAILED DESCRIPTION OF THE INVENTION

The water-in-oil coating composition according to the invention comprises a water phase emulsified in a non-aqueous liquid phase. The non-aqueous phase comprises one or more binders including an autoxidizable binder.

The water-in-oil coating composition has a solids content in the range of from 5 to 50 wt %, based on the total weight of the composition. Depending on the type of coating composition, e.g. a primer coating composition, a top coat composition, a wood stain, an opacifying coating composition such as trim paint, a different solids contents may be desired. Preferably the solids content is at least 10 wt %, more preferably at least 15 wt %, even more preferably at least 17 wt %, still more preferably at least 20 wt %. Preferably, the solids content is less than 45 wt %. In a preferred embodiment, the solids content is in the range of from 20 to 40 wt % based on the total weight of the composition.

Reference herein to solids content (SC) is to the weight percentage of non-volatile material contained in a composition, e.g. any material that remains in a coating film after drying of the film. Such material is typically binder polymers, pigments and non-volatile additives. The solids content can suitably be determined according to ISO 3251:2008 by drying a sample in an air-circulated oven at 125° C. for 1 hour.

The water-in-oil coating composition has a water content in the range of from 40 to 90 wt %, based on the total weight of the composition. A relatively high water content in an water-in-oil composition is desired as it reduces VOC-levels, which is desirable from a regulatory point of view. Preferably, the water content of the composition is at least 41 wt %, more preferably at least 42 wt %, even more preferably at least 44 wt %, still more preferably at least 45 wt %, most preferably at least 50 wt %. The water content is preferably less than 75 wt %, more preferably less 60 wt %. A water content in the range of from 40 to 60 wt % is particularly preferred.

The autoxidizable binder may be any autoxidizable binder known in the art or a mixture of two or more autoxidizable binders. The autoxidizable binder may for example be a drying oil, an alkyd resin, or a mixture of two or more thereof. The autoxidizable binder may be a drying oil that is a mixture of different unsaturated triglycerides.

Reference herein to an alkyd resin is to alkyds or to modified alkyds such as for example polyurethane modified alkyds, silicone modified alkyds, styrene modified alkyds, (meth)acrylic modified alkyds, vinylated alkyds, polyamide modified alkyds, or epoxy modified alkyds.

Any suitable alkyd resin may be used. Such alkyd resins are known in the art. Suitable alkyd resins for use in the autoxidizable binder, are in general the reaction product of the esterification of polyhydric alcohols with polybasic acids (or their anhydrides) and unsaturated fatty acids (or glycerol esters thereof), for example derived from linseed oil, tung oil, tall oil as well as from other drying or semi-drying oils. The properties are primarily determined by the nature and the ratios of the alcohols and acids used and by the degree of condensation. The alkyd resin may have any suitable molecular weight, oil length, or unsaturation of its fatty acid chains.

The non-aqueous phase may comprise a binder other than an autoxidizable binder. If the non-aqueous phase comprises a binder other than an autoxidizable binder, the amount of non-autoxidizable binder is preferably less than 10 wt % of the total weight of binders, more preferably less than 5 wt %, even more preferably less than 1 wt %. It is particularly preferred that the non-aqueous phase is free of any binder other than autoxidizable binder.

Preferably the water phase in the coating composition is free of any binder.

The one or more binders in the non-aqueous phase have a mass-average molecular mass (Mw) expressed in gram/mole, as determined in accordance with gel permeation chromatography according to ISO 16014-1 using a Agilent PL gel GPC column having a highly cross linked porous polystyrene/divinylbenzene matrix (such as PL100, PL1000, Mixed C, Polypore, Mixed B, Mixed A—each having its own optimum Mw separation range), a mobile phase of tetrahydrofurane (THF) with 1% v/v acetic acid, a flow rate of 1.0 ml/min, a column temperature of 40° C., and detection by refractive index (40° C.) and calibrated using polystyrene standards ranging from mass 162 to 3,000,000 g/mol.

Binders with a relatively low mass-average molecular mass (Mw) are typically used in wood stains and sealers as defined in subcategory f of Annex I of DIRECTIVE 2004/42/CE of the European Parliament and of the Council of 21 Apr. 2014, while binders with a relatively high Mw are typically used in trim and cladding paints (subcategories d and e of DIRECTIVE 2004/42/CE). Therefore, in one embodiment of the present disclosure the mass-average molecular mass (Mw) of the binder(s) is at least 800 grams/mole, preferably at least 10,000 grams/mole, more preferably at least 20,000 grams/mole, even more preferably at least 40,000 grams/mole. In another embodiment, the Mw is less than 100,000 gram/mole, preferably less than 80,000 grams/mole, more preferably less than 60,000 grams/mole, most preferably less than 50,000 grams/mole.

In case the composition comprises two or more binders, the mass-average molecular mass Mw is the mass-average molecular mass of the combination of binders, and can be calculated as $\Sigma(m_i * Mw_i)$, wherein $m_i$ is the weight fraction of binder i based on the total weight of binders, and $Mw_i$ is Mw of binder i.

The desired amount of autoxidizable resin in the composition of the invention depends on the intended use of the coating. A person skilled in the art will know how much alkyd is needed for the intended use. In one embodiment the amount of alkyd-based resin in the coating composition is in the range of from 5 wt % to 55 wt % based on the total weight of the composition, preferably of from 10 to 55 wt %, more preferably of from 15 to 55 wt %, particularly of from 17 to 50 wt %, most preferably of from 20 to 45 wt %.

It has been found that the water content in the water-in-oil coating composition can be higher than 40 wt % if the solids content of the composition, the water content of the composition, and the mass-average molecular mass of the one or more binders are such that value A in equation 1 below is at most 130:

$$A=[(Mw/1400)+(1.7 \times SC)+WC] \qquad \text{(equation 1)}$$

wherein Mw, SC and WC are as defined hereinabove and Mw is expressed in grams/mole and SC and WC are each expressed in wt %.

Compositions meeting the requirement of value A being at most 130 have acceptable applicability and a viscosity that allows application with a brush or roller. Water-in-oil coating compositions with a water content of at least 40 and a value for A above 130 are found to have a viscosity that is too high to allow for proper application of the coating on a substrate. Preferably, value A is at most 125, more preferably at most 120, even more preferably at most 115. Preferably, value A is at least 49, more preferably at least 58, even more preferably at least 70, still more preferably at least 80.

Reference herein to applicability of a coating composition is to the suitability of a coating composition to be applied to a surface. Poor applicability is characterized by one or more of the following:
- severe brush marks can be seen in the coating (both in the wet and dry stage);
- difficult or impossible to apply the composition onto a surface with uniform thickness with a brush or a roller;
- high force required to spread out the coating, or the coating composition has such high viscosity that it cannot be spread out over a substrate.

Poor applicability may e.g. be caused by a rapid or instant separation of the water phase and the non-aqueous phase of the water-in-oil coating composition, for example within 2 hours. Acceptable applicability of a coating composition means that the coating can be easily spread out over a substrate with little force, and that a coating layer with uniform thickness and equal distribution of pigments, binders and optional other ingredients over the resulting coating film can be obtained.

Preferably the viscosity of the composition of the present disclosure is less than 700 mPa·s, more preferably less than 500 mPa·s, even more preferably in the range of from 30 to 400 mPa·s, still more preferably in the range of from 40 to 300 mPa·s, still more preferably in the range of from 50 to 200 mPa·s; wherein the viscosity is determined at 23° C. at a shear rate of 10,000 $s^{-1}$ in accordance with ASTM D4287.

The non-aqueous phase is a liquid phase and may comprise a suitable organic solvent to dissolve the one or more binders, for instance an aromatic solvent such as toluene or xylene, or an aliphatic hydrocarbon solvent such as linear or branched alkanes comprising 6 to 10 carbon atoms. Commercially available solvents such as Shellsol® D40, Shellsol® D60, Dowanol® PMA, and Solvesso®-150 may be used.

The autoxidizable binder may be present in the water-in-oil coating composition in any suitable amount, depending on the intended use of the coating. Preferably, the non-aqueous phase comprises in the range of from 20 wt % to 95 wt % autoxidizable binder based on the total weight of the non-aqueous phase, more preferably of from 30 to 90 wt %, even more preferably from 35 to 70 wt %.

The water-in-oil coating composition preferably comprises a drier. The drier may be any primary drier known in the art in any suitable amount. The primary drier may for example be a salt of cobalt, cerium, iron, manganese, and/or vanadium, a cobalt-free metal-ligand complex, or a polymeric cobalt drier. Preferably, the coating composition does not comprise cobalt and is thus free of a primary drier comprising cobalt. The coating composition may further comprise coordination driers and/or secondary driers. Besides driers, the coating composition may optionally comprise drying-accelerating complexing agents, for example, 2,2'-bipyridyl and 1,10-phenantroline. The complexing agents can be added in an amount of from 0 to 3 wt. %, preferably from 0.1 to 1.5 wt. %, based on the total weight of binder.

The coating composition may comprise one or more additives. Any additives known to be suitable for coating compositions with autoxidizable binders, such as alkyds, may be used. Examples of suitable additives include anti-skinning agents, UV stabilizers, dispersants, surfactants, anti-static agents, flame-retardant agents, lubricants, anti-foaming agents, plasticizers, anti-freezing agents, waxes, and thickeners. The total amount of additives will usually be less than 5 wt %, based on the total weight of the coating composition, preferably less than 3 wt %.

The water-in-oil coating composition may be prepared in any suitable way, typically by emulsifying water under high shear conditions in a non-aqueous phase that comprises the autoxidizable binder. Suitable emulsification methods are known in the art. In the materials and methods section of Aurenty et al., Langmuir, 1995 vol. 11, pp 4712-4718, is for example disclosed a suitable emulsification method.

Surfactants may be used to assist emulsification of the water in the non-aqueous phase. Suitable surfactants are known in the art and include conventional anionic, cationic and/or non-ionic surfactants. The composition of the present disclosure may further comprises one or more surfactants.

The coating composition according to the invention may for example be used as an adhesive, a primer, a topcoat, a high-gloss or a matt coating, a wood coating, a wall paint or a flooring paint. The coating composition may suitably be used to coat any suitable substrate, such as for example wood, wood-based substrates (e.g. fibreboard, chipboard), metal, mineral substrates (e.g. stone, plaster, concrete, masonry, cement, gypsum), plastic substrates, ceramic substrates such as glass, asphalt, leather, paper.

The invention also relates to a substrate coated with a coating deposited from a water-in-oil coating composition according to the invention. The water-in-oil coating composition may be applied to the substrate by any suitable method known in the art, preferably by brushing, dipping, or roller coating.

The present invention will be further illustrated by means of the following non-limiting examples.

EXAMPLES

Water-in-Oil Coating Compositions

A titanium dioxide slurry (i.e. a pigment paste) was prepared by adding and mixing together 30.6 parts by weight of Setal 270 SM-70 (Allnex), 24.5 parts by weight of Nuosperse 657 RD (a wetting an dispersing agent, Elementis Specialties), 0.43 weight parts of Bentone SD-1 (a Rheological Additive, Elementis Specialties); 9.53 parts by weight of Shellsol D70 (an aliphatic mineral spirit consisting predominantly of C11-C14 paraffins and naphthenes (Shell)); and 59.19 parts by weight of Tioxide TR 92 (titanium dioxide, rutile, Huntsman Pigments).

A drier intermediate was prepared that comprised 22.2 parts by weight of Durham Nuodex Co neo 10; 33.3 parts by weight of Durham Nuodex Calcium 10; 44.4 parts by weight of Exkin 2 (methyl ethyl ketoxime, Huntsman Pigments). The total solids content of the drier intermediate was 26.2 wt %.

Water-in-oil coating compositions were prepared by emulsifying under high shear conditions water into a non-aqueous phase that comprised (in amounts shown in Table 2): one of more of the autoxidizable binder compositions shown in Table 1 the drier intermediate prepared as described above, additional Shellsol D70, and optionally the pigment paste prepared as described above. It is noted that the amount of Setal 270 SM-70 shown in Table 2 does not include the amount of Setal 270 SM-70 as present in the titanium dioxide slurry. The amount of Shellsoll D70 was chosen to obtain the desired solid content at a certain water content. The amount of drier intermediate used was such that the compositions comprised 7.73 grams of drier intermediate per 100 grams of binder solids.

TABLE 1 autoxidizable binders used

| Binder | Description | Mw (g/mole) | Solid content (wt %) |
|---|---|---|---|
| Setal 270 SM-70 (Allnex) | air-drying long oil alkyd resin based on soya bean oil, viscosity 5.5 Pa.s, acid value 6.7 mg KOH/g | 42,100 | 70 |
| Setal 304 (Allnex) | air drying unsaturated fatty acids-based long oil alkyd, viscosity 3.4 Pa.s, acid value 7.5 mg KOH/g | 7,900 | 98 |
| Linseed Oil (Alberdingk Boley) | Linseed oil | 1,360 | 100 |

TABLE 2 water-in-oil compositions

| Sample Nr | Setal 270 SM70 (wt %) | Setal 304 (wt %) | Linseed oil (wt %) | Drier composition (wt %) | Pigment slurry (wt %) | Shellsol D70 (wt %) | Water (wt %) |
|---|---|---|---|---|---|---|---|
| 1 |  | 15.3 |  | 1.2 |  | 33.5 | 50.0 |
| 2 |  | 15.3 |  | 1.2 |  | 23.5 | 60.0 |
| 3 | 8.4 | 3.0 | 7.4 | 1.1 |  | 24.9 | 55.2 |
| 4 | 21.4 |  |  | 1.2 |  | 37.4 | 40.0 |
| 5 |  | 12.8 |  | 1.0 | 16.7 | 27.9 | 41.7 |
| 6 | 19.3 | 10.4 |  | 1.9 |  | 28.3 | 40.0 |
| 7 | 21.4 | 6.4 | 2.5 | 1.9 |  | 27.8 | 40.0 |
| 8 | 15.4 | 3.7 | 3.6 | 1.4 |  | 23.9 | 52.0 |
| 9 | 16.1 | 11.5 | 2.5 | 1.9 |  | 23.0 | 45.0 |
| 10 | 26.8 | 6.4 |  | 1.9 |  | 24.9 | 40.0 |
| 11 |  | 30.6 |  | 2.3 |  | 17.1 | 50.0 |
| 12 | 16.1 | 3.8 |  | 1.2 |  | 18.9 | 60.0 |
| 13 | 6.7 | 2.4 | 5.9 | 0.9 | 20.0 | 19.9 | 44.2 |
| 14 |  | 11.5 |  | 0.9 | 25.0 | 17.6 | 45.0 |
| 15 | 12.3 | 2.9 | 2.9 | 1.1 | 20.0 | 19.1 | 41.6 |
| 16 | 21.4 |  |  | 1.2 |  | 17.4 | 60.0 |
| 17 |  | 30.6 |  | 2.3 |  | 7.1 | 60.0 |
| 18 | 24.9 |  | 12.6 | 2.3 |  | 10.2 | 50.0 |
| 19 | 21.4 | 15.3 |  | 2.3 |  | 10.9 | 50.0 |
| 20 | 10.7 | 23.0 |  | 2.3 |  | 4.0 | 60.0 |
| 21 | 32.1 | 7.7 |  | 2.3 |  | 7.9 | 50.0 |
| 22 | 33.9 |  | 6.3 | 2.3 |  | 7.5 | 50.0 |
| 23 |  | 23.0 |  | 1.7 | 25.0 | 5.3 | 45.0 |
| 24 |  | 38.1 |  | 2.9 |  |  | 59.0 |
| 25 | 8.0 | 17.2 |  | 1.7 | 25.0 | 3.0 | 45.0 |
| 26 |  | 45.9 |  | 3.5 |  | 0.6 | 50.0 |
| 27 | 30.3 | 8.5 | 8.3 | 2.5 |  |  | 50.5 |
| 28 | 15.5 | 33.1 |  | 3.4 |  |  | 48.1 |
| 29 | 41.0 | 4.1 | 4.0 | 2.4 |  |  | 48.5 |
| 30 | 40.7 |  |  | 2.2 |  |  | 57.0 |
| 31 | 44.7 |  | 8.3 | 3.1 |  |  | 44.0 |
| 32 |  | 28.6 |  | 2.2 | 25.0 |  | 44.2 |
| 33 | 54.6 |  |  | 3.0 |  |  | 42.5 |
| 34 | 19.8 | 14.2 |  | 2.2 | 20.0 |  | 43.9 |
| 35 | 24.2 | 6.8 | 6.7 | 2.0 | 20.0 |  | 40.4 |

Applicability of the Water-in-Oil Coating Compositions

Between 24 and 48 hours after preparation of the water-in-oil composition, the stability of the emulsion was visually determined, i.e. by slowly stirring with a spatula to check if the water had remained in its emulsified state. Sedimentation or creaming of a stable emulsion was allowed as long as the emulsion could be easily homogenized by manual stirring with e.g. a spatula. Only homogeneous emulsions were subjected to the applicability test. Prior to this test, samples were shaken for 3 minutes at 680 shakes per minute using a Fast and Fluid FFM SK450 shaking machine. Then the compositions were applied onto a wooden panel (10 cm×10 cm) with a normal brush and the applicability of the composition was scored on a scale of 0 to 5, ranking from poor applicability (score=0) to good applicability (score=5) as follows:

0: Coating is impossible to spread out
1: Spreading is very heavy, uneven coating, very poor levelling
2: Spreading is heavy, levelling is poor
3: Spreading is heavy, levelling slow, but acceptable in higher layer thickness
4: Spreading is slightly heavy, levelling is good
5: Spreading is easy, levelling is good As can be seen in Table 3, compositions with a value for A below 120 have good applicability (score 5). These could be spread easily over the surface of the test panel, resulting in a homogeneous layer.

If value A in equation 1 was between 120 and 130, applicability of the compositions varied and intermediate values for applicability were recorded (between 2 and 4).

The results also show that the composition of the present disclosure works for compositions with pigments such as titanium dioxide as is shown in samples 3, 12, 13, 15, and 22. Accordingly, in one embodiment the composition comprises at least 1 wt % titanium dioxide, preferably at least 2 wt %, more preferably at least 4 wt %, even more preferably at least 8 wt %, most preferably at least 10 wt %.

TABLE 3

Applicability of coating compositions

| Sample no | Mw | SC | WC | Applicability score | Value A |
|---|---|---|---|---|---|
| 1 | 7,900 | 15.3 | 50.0 | 5 | 81.6 |
| 2 | 7,900 | 15.3 | 60.0 | 5 | 91.6 |
| 3 | 17,314 | 16.5 | 55.2 | 5 | 95.6 |
| 4 | 42,100 | 15.3 | 40.0 | 5 | 96.1 |
| 5 | 15,498 | 26.3 | 41.7 | 5 | 97.5 |
| 6 | 27,394 | 24.2 | 40.0 | 5 | 100.7 |
| 7 | 28,781 | 24.3 | 40.0 | 5 | 101.8 |
| 8 | 27,068 | 18.4 | 52.0 | 5 | 102.6 |
| 9 | 22,640 | 25.5 | 45.0 | 5 | 104.6 |
| 10 | 33,531 | 25.5 | 40.0 | 5 | 107.4 |
| 11 | 7,900 | 30.6 | 50.0 | 5 | 107.6 |
| 12 | 33,606 | 15.3 | 60.0 | 5 | 110.0 |
| 13 | 23,484 | 29.4 | 44.2 | 5 | 110.9 |
| 14 | 18,928 | 31.7 | 45.0 | 5 | 112.5 |
| 15 | 30,549 | 30.8 | 41.6 | 5 | 115.8 |
| 16 | 42,100 | 15.3 | 60.0 | 5 | 116.1 |
| 17 | 7,900 | 30.6 | 60.0 | 5 | 117.6 |
| 18 | 24,986 | 30.6 | 50.0 | 5 | 119.9 |
| 19 | 25,002 | 30.6 | 50.0 | 3 | 119.9 |
| 20 | 16,430 | 30.6 | 60.0 | 2 | 123.8 |
| 21 | 33,502 | 30.6 | 50.0 | 3 | 126.0 |
| 22 | 33,553 | 30.6 | 50.0 | 4 | 126.0 |
| 23 | 14,474 | 43.2 | 45.0 | 4 | 128.9 |
| 24 | 7,900 | 38.1 | 59.0 | 0 | 129.4 |
| 25 | 21,378 | 43.2 | 45.0 | 2 | 133.6 |
| 26 | 7,900 | 45.9 | 50.0 | 3 | 133.7 |
| 27 | 25,618 | 38.5 | 50.5 | 1 | 134.1 |
| 28 | 16,448 | 44.1 | 48.1 | 0 | 134.9 |
| 29 | 33,910 | 37.4 | 48.5 | 0 | 136.2 |
| 30 | 42,100 | 29.1 | 57.0 | 0 | 136.5 |
| 31 | 33,545 | 40.4 | 44.0 | 2 | 136.6 |
| 32 | 13,394 | 48.8 | 44.2 | 3 | 136.8 |
| 33 | 42,100 | 39.0 | 42.5 | 0 | 138.8 |
| 34 | 27,258 | 44.5 | 43.9 | 0 | 139.1 |
| 35 | 27,622 | 47.0 | 40.4 | 2 | 140.1 |

The invention claimed is:

1. A water-in-oil coating composition comprising a water phase emulsified in a non-aqueous liquid phase, wherein the non-aqueous phase comprises one or more binders including an autoxidizable binder, characterized in that:
   i. the composition has a solids content (SC) in the range of from 5 to 50 wt % based on the total weight of the composition;
   ii. the composition has a water content (WC) in the range of from 40 to 90 wt % based on the total weight of the composition;
   iii. the one or more binders have a mass-average molecular mass (Mw) expressed in gram/mole, as determined in accordance with GPC ISO 16014-1; and
   iv. the solids content of the composition, the water content of the composition and the mass-average molecular mass of the one or more binders are such that value A is at most 130, wherein value A is defined as:

$A=[(Mw/1400)+(1.7 \times SC)+WC]$ wherein Mw is expressed in gram/mole and SC and WC are each expressed in wt %.
2. The water-in-oil coating composition according to claim 1, wherein value A is at most 120.
3. The water-in-oil coating composition according to claim 1, wherein the water content of the composition is at least 41 wt %.
4. The water-in-oil coating composition according to claim 1, wherein the water content of the composition is less than 75 wt %.
5. The water-in-oil coating composition according to claim 1, wherein the solids content of the composition is at least 10 wt %.
6. The water-in-oil coating composition according to claim 1, wherein the solids content of the composition is less than 40 wt %.
7. The water-in-oil coating composition according to claim 1, wherein Mw is at least 800 gram/mole.
8. The water-in-oil coating composition according to claim 1, wherein Mw is less than 100,000 gram/mole.
9. The water-in-oil coating composition claim 1, wherein the autoxidizable binder is a drying oil, an alkyd resin, or a mixture of two or more thereof.
10. The water-in-oil coating composition according to claim 1, wherein the one or more binders do not comprise any binder other than autoxidizable binder.
11. The water-in-oil coating composition according to claim 1, wherein value A is at least 49.
12. The water-in-oil coating composition according to claim 1 further comprising one or more pigments.
13. The water-in-oil coating composition according to claim 1 further comprising one or more components selected from the group consisting of surface-active agents, salts, driers, biocides, rheology modifiers, anti-skinning agents, UV stabilizers, and non-aqueous solvents.
14. A substrate coated with a coating deposited from a water-in-oil coating composition according to claim 1.

* * * * *